May 23, 1933.  E. K. LYNN  1,910,491

ADJUSTING DEVICE

Filed July 25, 1931

INVENTOR.
EWING K. LYNN
By *Wm. M. Cody*
ATTORNEY.

Patented May 23, 1933

1,910,491

UNITED STATES PATENT OFFICE

EWING K. LYNN, OF EAST McKEESPORT, PENNSYLVANIA, ASSIGNOR TO THE WESTINGHOUSE AIR BRAKE COMPANY, OF WILMERDING, PENNSYLVANIA, A CORPORATION OF PENNSYLVANIA

ADJUSTING DEVICE

Application filed July 25, 1931. Serial No. 553,137.

This invention relates to adjusting devices for control valves and the like.

While the invention is primarily designed to obviate certain disadvantages in the operation of conductor valve devices employed at the rear end of trains for effecting an application of brakes by reducing the brake pipe pressure, the invention may be advantageously employed in numerous other capacities.

In conductor valves of the diaphragm type, similar to the one to be hereinafter described, which are now in common use, no provision is made for adjustment of the diaphragm operating means to compensate for wear due to compression of the diaphragm or other causes, nor is any adjustment possible to reduce the slack motion of the operating handle in manipulating the valve. By reason of this deficiency, considerable difficulty has been experienced in the operation and maintenance of these valves in service.

The primary object of the present invention is to overcome the above noted defects by the provision of means in a control valve for reducing the slack in operating handle movement to a minimum so as to effect a more prompt valve action upon the initial manipulation of the handle.

A further object of the present invention is the provision of means adjustable to compensate for wear to insure proper operation of the valve after long use.

Another object resides in the provision of adjusting means within the valve which are readily accessible for adjustment, replacement or repair without necessitating the complete removal of the valve to effect the desired operation.

Another object of the invention is the provision in a control valve of means readily adjustable to prevent leakage losses through the valve.

Other objects and advantages will appear from the following description of an illustrative embodiment of the present invention.

Figure 1:
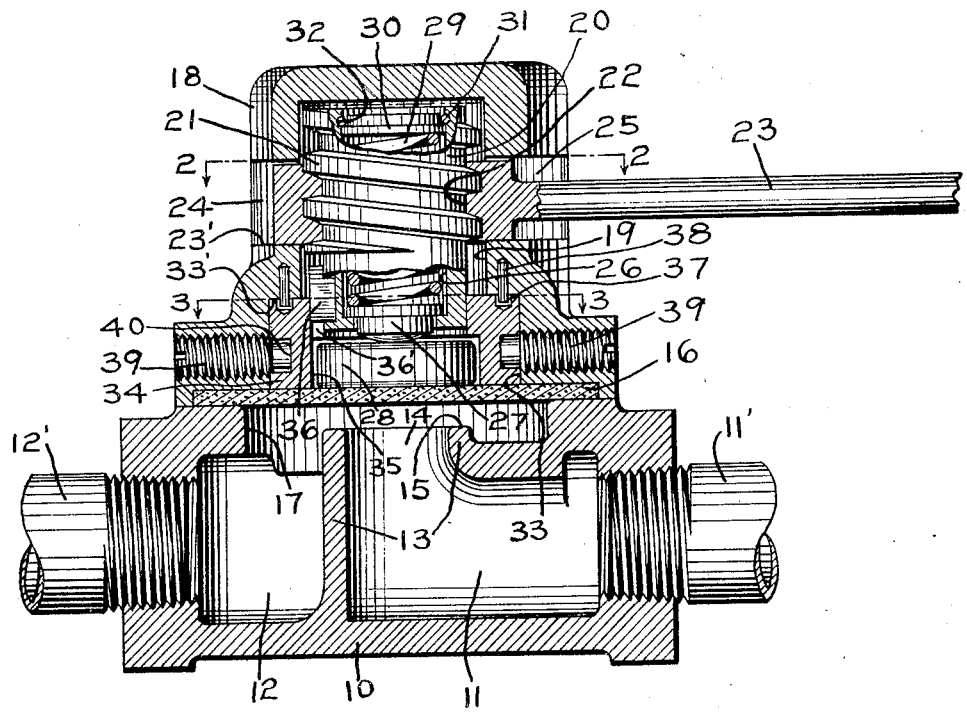
Figure 2:
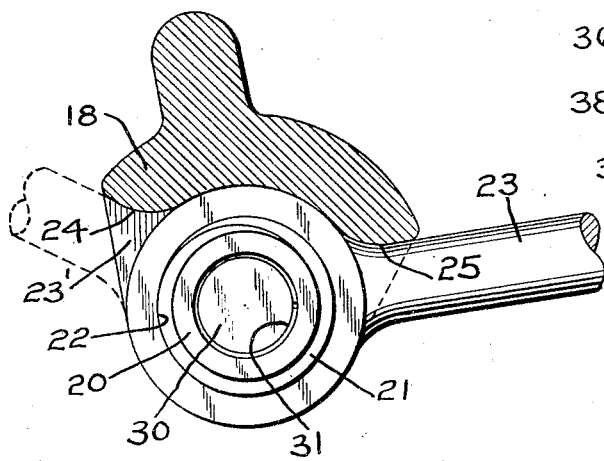
Figure 3:
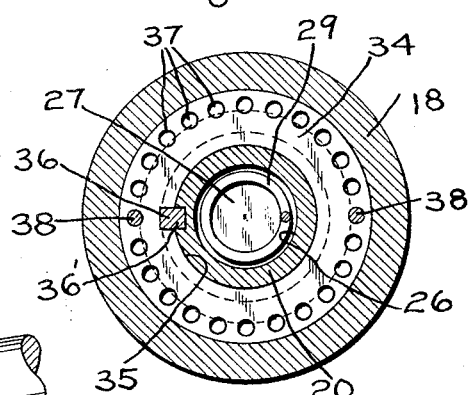

In the drawing; Fig. 1 is a longitudinal mid-sectional view taken through a control valve provided with adjusting means constructed in accordance with the teachings of my invention; Fig. 2 is a sectional view on the line 2—2 of Fig. 1 showing the valve handle in full lines in the open position of the valve and in dotted lines in the closed position; and Fig. 3 is a sectional view taken on the line 3—3 of Fig. 1.

The control valve, including an illustrative embodiment of the present invention comprises a body portion 10 containing a pair of chambers 11 and 12 separated by a web or partition 13. The chamber 11 may be considered to be supplied with fluid under pressure through a pipe 11' which is suitably connected to the usual brake pipe of the train. The chamber 12 communicates with the atmosphere through a suitable pipe 12'. A port 14 in the partition 13 is surrounded by an upstanding rib 15 which forms a valve seat with which a flexible diaphragm 16, to be hereinafter more specifically described, is adapted to engage to control communication between the chambers 11 and 12. The flexible diaphragm 16 serves to form a closure for an opening 17 in the body portion 10 and is retained in position on the body portion by the application of a cover portion 18 which is secured to the body by any suitable means such as cap screws (not shown).

The cover portion 18 is provided with a centrally disposed cylindrical bore 19 within which is housed the diaphragm manipulating means.

This mechanism comprises a cylindrical member 20 provided with external screw-threading 21 adapted to be received in a similarly threaded aperture 22 in a manipulating handle 23. The handle 23 is positioned in a slot 23' formed in the cover portion 18. The throw of the handle 23 is limited by stops 24 and 25 which are preferably formed as the end faces of the slot 23. A bore 26 formed in the member 20 serves to receive a flanged pressure pad 27 which is adapted to project beyond the lower extremity of the member 20 to engage the upper face of a follower 28. The plate 27 is normally retained in its extreme lower-most position by the action of a coil spring 29 which bears against it and is retained in the bore 26 by a disc 30 which is secured in the bore 26 by the application of a spring ring 31 to a groove 32 formed in the wall of the bore 26.

The bore 19 in the cover portion 18 is enlarged as at 33 to receive a ring member 34. This ring 34 is provided with an aperture 35 for receiving and guiding the lower end of the member 20. A key 36 which is anchored in the member 20 is longitudinally movable within a key way 36' formed in the interior wall of the ring 34, serves to unite the member 20 and ring 34 to prevent relative rotation therebetween. The upper face of the ring 34 is pierced by a circular series of drilled holes 37, two of which are selectively adapted to receive anchor pins 38 mounted in the cover portion 18 and projecting into the enlarged portion 33 of the bore 19. The engagement between the anchor pins 38 and holes 37 serves merely to retain the ring 34 in a suitable position of adjustment to insure the proper setting of the member 20 within the bore 19. The ring 34 and member 20 which is keyed thereto are actually retained against rotation within the bore 19 by the adjustment of set screws 39 which are carried by the cover portion 18 of the valve and whose inner ends bear against the base of a groove 40 formed in the outer face of the ring 34.

The proper assembly of the device is effected by the insertion of the handle 23 into the slot 23' in the cover 18 of the valve. With the handle held against the stop 25 which designates the extreme open position of the valve, the member 20, within which the pressure pad 27 and coil spring 29 have already been placed, is screwed into the threaded aperture 22 of the handle until the upper extremity of the member 20 lies adjacent the upper end of the bore 19. The ring 34 is then inserted into the opening 33 and the key way 36' is brought into line with the key 36 on the member 20. When proper alignment is effected, the ring is seated against a flange 33', with the pins 38 projected into the particular holes 37 adjacent them. A gauge block having a central projection accurately machined to the dimension which will establish the diaphragm at the proper distance from the valve seat, when in fully open position is then applied to the lower face of the ring 34. If the projection on the gauge block fails to establish contact with the curved face of the pressure pad 27, or forces the pad inwardly against the pressure of the coil spring 29, adjustment must be made by partially removing the ring 34 to free the pins 38 from engagement with the holes 37. When the ring 34 is free is may be rotated in one direction or the other to propel or repel the member 20 to shift it inwardly or outwardly to effect adjustment of the pad 27 to bring it into the approximate proper position. The ring 34 may then be repositioned upon the anchor pins 38 and the gauge block reapplied. This process is repeated until the gauge block contacts with the pad 27 without displacing it. When this adjustment has been effected, the set screws 39 are tightened to anchor the ring 34 within the cover 18 and the follower 28 is placed within the ring 34. The diaphragm is then applied to the cover and the cover screwed on to the valve body to complete the assembly.

In the above described assembly of the device the stop 25 determining the extreme open position of the valve was used merely for the purpose of convenience and it is quite obvious that the substitution of another gauge block might readily accomplish the same result with the valve handle 23 retained in contact with the stop 24, which determines the position at which the diaphragm 16 is in contact with the valve seat to close the port 14 between the chambers 11 and 12.

The diaphragm 16 may be moved from its open position shown in Figure 1 to a closed position by swinging the handle 23 from the position shown in full lines in Figure 2 to the dotted line showing on that figure, that is from contact with the stop 25 to contact with the stop 24. The swinging of the handle from right to left will cause the member 20 to move downwardly by reason of its screw-threaded engagement with the handle and due to the fact that the member is held against rotation by means of the key 36. The pad 27 will also move downwardly and exert pressure upon the follower 28 which in turn bears against the top of the diaphragm 16 and causes the diaphragm to be deflected downwardly until its lower side is in sealing contact with the rib 15, thus closing the port 14. This position of the diaphragm is reached just prior to reaching the extreme throw of the handle 23. The slight remaining throw of the handle to the point of contact with the stop 24 serves merely to place the coil spring 29 under slightly greater compression by reason of the fact that the continued downward movement of the member 20 has compressed the spring 29. This additional compression pressure insures the proper seating of the diaphragm to eliminate valve leakage.

Obviously, upon reversing the movement of the handle and swinging it from contact with the stop 24 to the stop 25, the pressure upon the resilient diaphragm will be released as the member 20 travels upwardly and the diaphragm will resume the position shown in Figure 1 in which the port 14 is open.

Long continued operation of the valve may cause the diaphragm to be compressed to a point where leakage will occur in the valve. Upon the happening of such an occurrence, it is not necessary to replace the diaphragm as has been universally the case in prior valves of this type. Should this occasion arise in the present valve, it may readily be remedied by removing the cover portion 18, loosening the set screws 39, sliding the ring 34 outwardly to free it from engagement with the pins 38 and rotating the ring a sufficient amount to draw the member 20 downwardly to compensate for the wear on the diaphragm. The ring may then be replaced on the pins 38 and anchored in the manner previously described and the repair has been expeditiously accomplished without necessitating the removal of the valve or even the replacement of the diaphragm. This same method of adjustment may also be employed to compensate for other wear in the valve mechanism.

It will readily be seen from the foregoing specification that an improved valve has been produced containing an adjusting device which may readily be reset to compensate for wear and thereby provide a valve made capable of long and hard usage by minor adjustment to overcome leakage and early fatigue common to present valves of the same type.

By reason of the structure of the valve hereinabove described it will also be noted that by means of simple adjustment of the ring 34 it is possible to effect the prompt unseating of the diaphragm upon the initial movement of the handle 23 away from the stop 24. This feature is of vital importance as the present valve has overcome a serious defect in prior valves of this type by providing prompt and positive diaphragm action upon initial movement of the operating handle.

While the invention has been described in considerable detail in the foregoing specification, it is understood that various changes may be made in its embodiment without departing from or sacrificing any of the advantages hereinafter claimed.

Having now described my invention, what I claim as new and desire to secure by Letters Patent, is:

1. In a valve device, the combination of a casing having inlet and outlet passages, a valve seat interposed between said passages, a flexible diaphragm for controlling communication between said passages, a cover for said casing, a screw-threaded member mounted in said casing for operating said diaphragm, a handle cooperating with the screw threads on said member for moving said member, a compression spring mounted in and movable with said member and through which said member yieldingly presses said diaphragm against said valve seat, and means within said cover adjustable to vary the spring pressure between said member and diaphragm to effect the desired opening of said valve upon movement of said handle.

2. In a valve device, the combination of a casing having inlet and outlet passages, a valve seat interposed between said passages, a flexible diaphragm for controlling communication between said passages, a cover for said casing, a screw-threaded member mounted in said casing for operating said diaphragm, a handle cooperating with the screw-threads on said member for moving said member, a spring mounted in said member and through which said member presses said diaphragm against said valve seat, a slot in said cover for receiving said handle, a stop for limiting the movement of said handle in one direction in said slot, means for retaining said member against rotation in said cover, and means within said cover adjustable to vary the spring pressure between said member and diaphragm to effect the desired opening of said valve upon the initial movement of said handle from said stop.

3. In a valve device, the combination of a casing having inlet and outlet passages, a valve seat interposed between said passages, a flexible diaphragm for controlling communication between said passages, a screw-threaded member mounted in said casing for operating said diaphragm, a key on said member, a second member for slidably receiving said first member, a key way in said second member for guiding the movement of said first named member, means for anchoring said second named member against rotation in said casing, an abutment on said casing, a series of recesses in said second named member selectively adaptable to receive said abutment, a handle cooperating with the screw threads on said first named member for moving said member, a stop on said casing for limiting the movement of said handle in one direction, and means within said casing for varying the displacement of said diaphragm upon the initial movement of said handle from said stop, said means comprising the rotation of said second named member to a position where the registry of one of said recesses with said abutment will effect the desired opening of said valve upon movement of said handle.

4. In a valve device, the combination of a casing having inlet and outlet passages, a valve seat interposed between said passages, a flexible diaphragm for controlling communication between said passages, a screw-threaded member mounted in said casing for operating said diaphragm, a key on said member, a second member for slidably receiving said first member, a key way in said second member for guiding the movement of said first named member, means for anchoring said second named member against rotation in said casing, an abutment on said casing, a series of recesses in said second named member selectively adapted to receive said abutment, a handle cooperating with the screw threads on said first named member for moving said member, a stop on said casing for limiting the movement of said handle in one direction, a compression spring operatively interposed between said first named member and diaphragm, and means within said casing for varying the compression of said spring for varying the displacement of said diaphragm upon the initial movement of said handle from said stop, said means comprising the rotation of said second named member to a position where the registry of one of said recesses with said abutment will effect the desired opening of said valve upon movement of said handle.

In testimony whereof I have hereunto set my hand, this 23rd day of July, 1931.

EWING K. LYNN.